United States Patent
Reynolds et al.

(10) Patent No.: US 11,427,315 B2
(45) Date of Patent: Aug. 30, 2022

(54) ROTOR BLADE CONTROL SYSTEM

(71) Applicant: Bell Helicopter Textron Inc., Fort Worth, TX (US)

(72) Inventors: Robert P. Reynolds, Euless, TX (US); Glenn A. Shimek, Kennedale, TX (US); Brady G. Atkins, Euless, TX (US); William D. Girard, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 487 days.

(21) Appl. No.: 16/453,700

(22) Filed: Jun. 26, 2019

(65) Prior Publication Data

US 2020/0407056 A1 Dec. 31, 2020

(51) Int. Cl.
*B64C 27/605* (2006.01)
*B64C 29/00* (2006.01)

(52) U.S. Cl.
CPC ........ *B64C 27/605* (2013.01); *B64C 29/0033* (2013.01)

(58) Field of Classification Search
CPC ....... B64C 27/59; B64C 27/605; B64C 11/32; B64C 11/36
See application file for complete search history.

(56) References Cited

U.S. PATENT DOCUMENTS

| | | | |
|---|---|---|---|
| 5,135,356 A * | 8/1992 | Shepherd | B64C 27/605 416/114 |
| 8,070,091 B2 | 12/2011 | Benson et al. | |
| 8,142,158 B2 * | 3/2012 | Schmaling | B64C 27/605 416/159 |
| 9,156,547 B2 | 10/2015 | Dickman et al. | |
| 9,169,735 B2 * | 10/2015 | Stamps | B64C 11/06 |
| 9,181,811 B2 | 11/2015 | Germanetti | |
| 9,567,070 B2 * | 2/2017 | Shundo | B64C 29/0033 |
| 9,669,923 B2 | 6/2017 | Goette et al. | |
| 9,764,832 B2 | 9/2017 | Hoyle et al. | |
| 10,065,734 B2 | 9/2018 | Worsham, II et al. | |
| 10,093,415 B1 | 10/2018 | Fortenbaugh et al. | |

(Continued)

FOREIGN PATENT DOCUMENTS

DE 102008028866 B4 * 4/2011 ........... B64C 27/605

*Primary Examiner* — Tye William Abell
(74) *Attorney, Agent, or Firm* — Timmer Law Group, PLLC

(57) ABSTRACT

A rotor blade control system and methods therefor including a hub assembly pivotally attached to a rotor blade; a mast attached to the hub assembly; a swashplate assembly engaged with the mast and including a swashplate actuation mechanism pivotally coupled with the non-rotating ring at a plurality of coupling locations for moving the non-rotating ring and pivotally coupled with the base at a plurality of base locations, the swashplate actuation mechanism comprises a plurality of substantially triangular dual actuator assemblies that are independently and concurrently operable to move the respective coupling location so as to impart movement on the non-rotating ring. The swashplate actuation mechanism is configured to move the swashplate assembly about a longitudinal axis and a lateral axis in response to a cyclic input. The swashplate actuation mechanism is configured to move the swashplate assembly along the mast in response to a collective input.

15 Claims, 9 Drawing Sheets

(56) References Cited

U.S. PATENT DOCUMENTS

| | | |
|---|---|---|
| 2011/0274548 A1 | 11/2011 | Stamps et al. |
| 2015/0175259 A1* | 6/2015 | Foskey ................. B64C 27/001 416/106 |
| 2017/0072327 A1* | 3/2017 | Wach ..................... A63G 31/16 |
| 2018/0079503 A1 | 3/2018 | Ivans et al. |
| 2021/0261244 A1* | 8/2021 | Delli Paoli ............. B64C 27/82 |
| 2021/0323661 A1* | 10/2021 | Ge ........................ B64C 27/605 |

\* cited by examiner

ROTOR BLADE CONTROL SYSTEM

BACKGROUND

Technical Field

The present disclosure relates generally to rotor systems, and more specifically, to a rotor blade system without an anti-drive mechanism.

Description of Related Art

Rotor systems for helicopters and tiltrotor aircraft are necessary systems to create flight. As depicted in FIG. 1, a conventional rotor assembly 100 includes a hub assembly 102 configured to pivotally attach to and rotate one or more blades 104 during flight. The root section 106 of blade 104 attaches to a rotating ring 108 of swashplate 110 via a pitch link 112. The swashplate 110 includes a rotating ring 108 configured to rotate and traverse along the mast 120 in a direction D1. The swashplate 110 also includes a non-rotating ring 114 engaged with the top case 116 of the transmission via three single control rods (not shown) and an anti-drive mechanism 118. The control rods provide cyclic and collective controls by tilting the non-rotating ring 114. The anti-drive mechanism 118 is typically a scissor linkage that moves toward and away from the hub assembly 102 and restrains the non-rotating ring 114 from rotating.

Although effective in traversing the swashplate 110 along the mast 120 in the collective stroke direction, as depicted with arrow D1, it should be understood that the anti-drive mechanism 118 does not efficiently perform in all scenarios. Moreover, the anti-drive mechanism 118 requires substantial components that withstand strong rotational forces, which unfortunately causes the anti-drive mechanism 118 to be heavy and complex. Failure of the anti-drive mechanism 118 can cause loss of controllability of the rotor system 100. The anti-drive mechanism 118 is designed to be robust, which can add significant weight to the rotor system 100. Thus, while the foregoing developments in the field of rotor systems represent great strides, however many shortcomings remain.

SUMMARY

In a first aspect, there is provided a rotor blade control system including a hub assembly pivotally attached to a rotor blade; a mast attached to the hub assembly; a swashplate assembly engaged with the mast, the swashplate assembly comprising: a rotating ring; a non-rotating ring; and a gimbal ring disposed between the rotating ring and the mast; a base spaced apart from the non-rotating ring; and a swashplate actuation mechanism pivotally coupled with the non-rotating ring at a plurality of coupling locations for moving the non-rotating ring and pivotally coupled with the base at a plurality of base locations, the swashplate actuation mechanism comprises a plurality of substantially triangular dual actuator assemblies that are independently and concurrently operable to move the respective coupling location so as to impart movement on the non-rotating ring, each of the substantially triangular dual actuator assemblies comprises a first actuator element and a second actuator element that are secured at a coupling location that defines an apex of a substantially triangular dual actuator assembly; wherein the swashplate actuation mechanism is configured to move the swashplate assembly about a longitudinal axis and a lateral axis in response to a cyclic input; wherein the swashplate actuation mechanism is configured to move the swashplate assembly along the mast in response to a collective input.

In an embodiment, the first actuator element and the second actuator element are independently and concurrently operable to move the coupling location of the non-rotating ring.

In another embodiment, the first actuator element and the second actuator element each comprise a primary actuating device configured to extend and/or withdraw a movable rod from an actuator body.

In an exemplary embodiment, the first actuator element and the second actuator element further comprise a secondary actuating device configured to extend and/or withdraw the movable rod from the actuator body.

In an illustrative embodiment, the first and the second actuator elements being independently operable to extend and/or withdraw a first and second movable rod from a first and second actuator body, respectively, the first and second movable rods meet at the coupling location to define the apex of the substantially triangular dual actuator assembly.

In yet another embodiment, the first and second actuator elements comprise at least one of the following: a linear actuator, an electric actuator, a pneumatic actuator, a hydraulic actuator, and an electromechanical rotary actuator.

In an embodiment, the base comprises an upper surface facing on a gearbox.

In another embodiment, the base comprises a side surface on a gearbox.

In an exemplary embodiment, the plurality of substantially triangular dual actuator assemblies is pivotally coupled with the non-rotating ring at three coupling locations arranged in a triangular pattern and pivotally coupled with the base at six base locations arranged in a hexagon pattern.

In still another embodiment, the three coupling locations each comprises a common coupling location.

In an embodiment, each of the coupling locations includes at least two pivot joints.

In yet another embodiment, the swashplate actuation mechanism further comprises a position sensor associated with each of the first actuator element and the second actuator element, the position sensor configured for measuring a position of the respective first actuator element and second actuator element.

In an embodiment, rotor blade control system further includes a pilot control assembly configured to receive commands from a pilot; and a flight control computer in electrical communication with the swashplate actuation mechanism and the pilot control assembly, the flight control computer configured to make a command to at least one of the substantially triangular dual actuator assemblies to move the swashplate assembly along at least one of a longitudinal axis, a lateral axis, and a mast axis.

In an embodiment, the flight control computer includes a fly-by-wire flight control system in electrical communication with the pilot control assembly.

In an illustrative embodiment, the flight control computer is configured to: identify a failure associated with at least one of the first actuator element and the second actuator element in a substantially triangular dual actuator assembly; disengage the actuator element associated with the failure; and determine a modified command signal to an at least one functioning actuator element, the modified command signal configured such that the at least one functioning actuator element assumes full functional responsibility for the substantially triangular dual actuator assembly.

In another embodiments, the flight control computer is configured to: identify a failure associated with a primary actuating device of a first actuator element or a second actuator element; disengage the primary actuating device associated with the failure; and engage a secondary actuating device in the first actuator or the second actuator element associated with the failure such that the secondary actuating device assumes full functional responsibility for moving the first actuator element or the second actuator element associated with the failure.

In a second aspect, there is provided a method of controlling a plurality of rotor blades, the plurality of rotor blades rotatably connected to a hub assembly attached to a mast, the method including providing a swashplate assembly engaged with the mast, the swashplate assembly comprising: a rotating ring; a non-rotating ring; and a gimbal ring disposed between the rotating ring and the mast; providing a swashplate actuation mechanism pivotally coupled with the non-rotating ring at a plurality of coupling locations for moving the non-rotating ring and pivotally coupled with a base at a plurality of base locations, the swashplate actuation mechanism comprises a plurality of substantially triangular dual actuator assemblies that are independently and concurrently operable to move the respective coupling location so as to impart movement on the non-rotating ring, each of the substantially triangular dual actuator assemblies comprises a first actuator element and a second actuator element that are secured at a coupling location that defines an apex of a substantially triangular dual actuator assembly; and actuating the swashplate actuation mechanism with a command from a flight control computer to the first actuator element and the second actuator element in each of the plurality of substantially triangular dual actuator assemblies so as to move the swashplate assembly along at least one of a longitudinal axis, a lateral axis, and a mast axis.

In an embodiment, the flight control computer comprises a fly-by-wire flight control system in electrical communication with the pilot control assembly.

In another embodiment, the method includes: identifying a failure associated with at least one of the first actuator element and the second actuator element in a substantially triangular dual actuator assembly; disengaging the actuator element associated with the failure; and determining a modified command signal to an at least one functioning actuator element, the modified command signal configured such that the at least one functioning actuator element assumes full functional responsibility for the respective substantially triangular dual actuator assembly.

In an embodiment, the method includes identifying a failure associated with a primary actuating device of a first actuator element or a second actuator element; disengaging the primary actuating device associated with the failure; and engaging a secondary actuating device in the first actuator element or the second actuator element associated with the failure such that the secondary actuating device assumes full functional responsibility for moving the first actuator element or the second actuator element associated with the failure.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
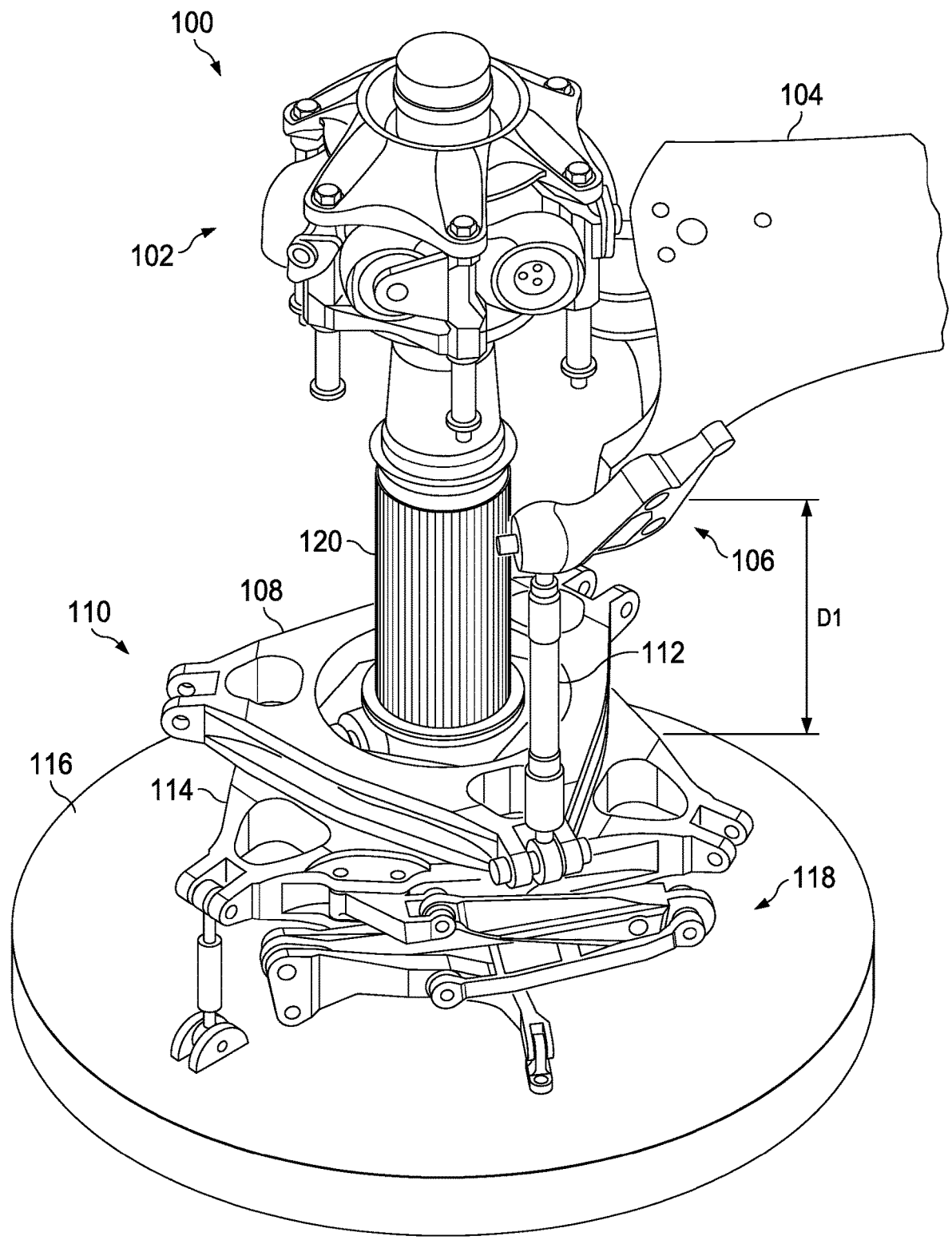
FIG. 1 is an oblique view of a conventional rotor system.

Illustrative embodiments of rotor blade control systems, devices, and methods are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The systems, devices, and methods of the present application will be understood, both as to their structure and operation, from the accompanying drawings, taken in conjunction with the accompanying description. Several embodiments of the systems, devices, and methods are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

The system, devices, and methods of the present application overcomes the abovementioned problems commonly associated with conventional rotor systems. Specifically, the system, devices, and methods of the present application include a swashplate actuation mechanism including a plurality of substantially triangular dual actuator assemblies that are independently and concurrently operable to move a non-rotating ring in a swashplate assembly that eliminates the need for an anti-drive mechanism while providing an added level of safety and redundancy in controlling the rotor blades. Further detailed descriptions of these features are provided below and illustrated in the accompanying drawings.

The system, devices, and methods relating thereto depicted and/or described herein can be used with any aircraft having one or more rotor blade, including tiltrotor aircrafts, helicopters, autogyros, tilt wing aircrafts, unmanned aerial vehicles (UAVs), hovercrafts, drones, personal air vehicles, and other vertical lift or VTOL aircrafts, or can further be used with any device having one or more components having rotor assemblies, including devices with propellers, windmills, and turbines. Further, any features of one embodiment of the rotor blade control system, devices, and methods relating thereto in this disclosure can be used with any other embodiment described herein such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Figure 2:
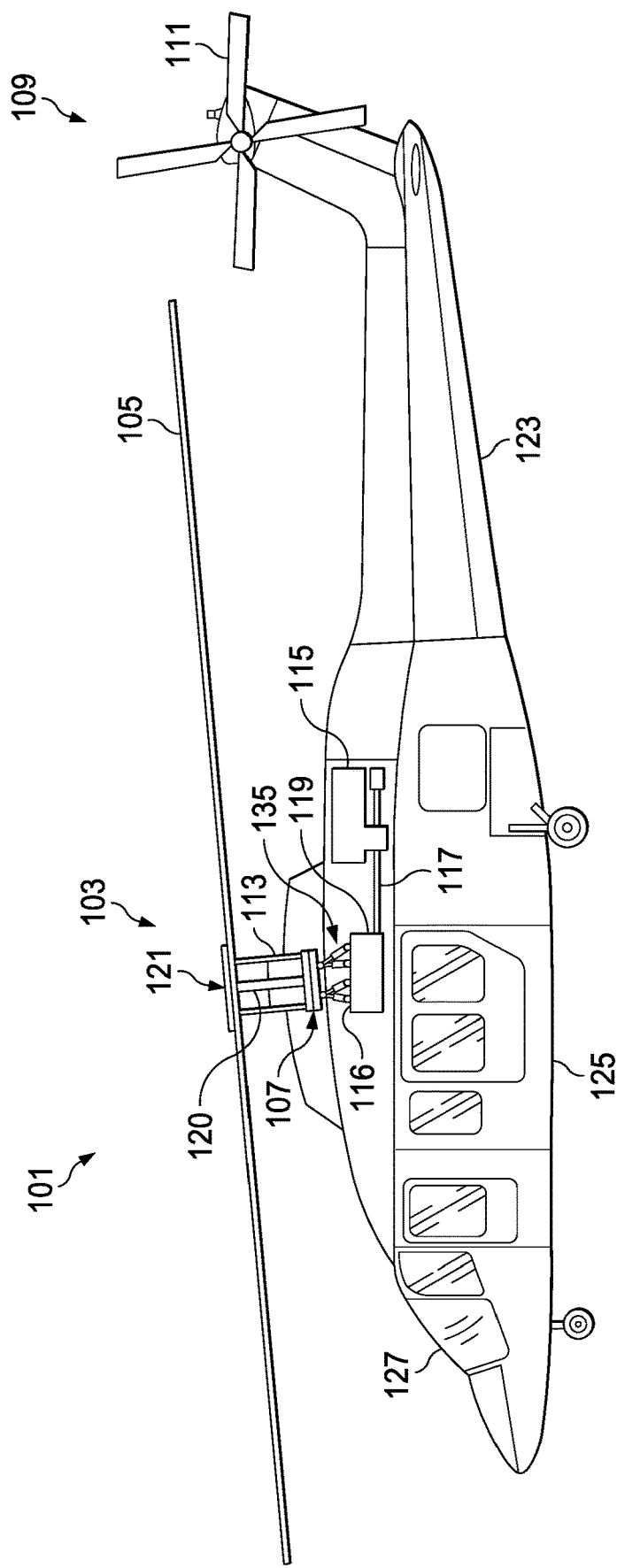
FIG. 2 is a side view of a helicopter according to an embodiment.

FIG. 2 depicts a rotorcraft 101 according to some embodiments. The rotorcraft 101 has a rotor assembly 103 (e.g., a main rotor assembly), which includes a mast 120 and rotor hub assembly 121 configured to pivotally attach to and rotate a plurality of main rotor blades 105. The pitch of each main rotor blade 105 may be controlled by a swashplate assembly 107 (via a pitch links 113) in order to selectively control the attitude, altitude, and movement of the rotorcraft 101. An exemplary embodiment of a swashplate actuation mechanism 135 is shown and used to control the position of the swashplate assembly 107 for collectively and/or cyclically changing the pitch of the main rotor blades 105. The rotorcraft 101 also has an anti-torque system, which may include a tail rotor 109 with tail rotor blades 111, no-tail-rotor, or dual main rotor system.

Power is supplied to the main rotor assembly 103 by engines 115. One or more engines 115 provide output to a driveshaft 117, which is mechanically and operatively coupled to the main rotor assembly 103 through a main rotor gearbox 119.

The rotorcraft 101 further includes a fuselage 125 and tail section 123. In some embodiments, the fuselage 125 includes a cockpit 127 that can be configured to accommodate a pilot and a co-pilot. In other embodiments, the cockpit is configured as an unmanned vehicle, in which case cockpit 127 could be eliminated to save space and cost.

Figure 3:
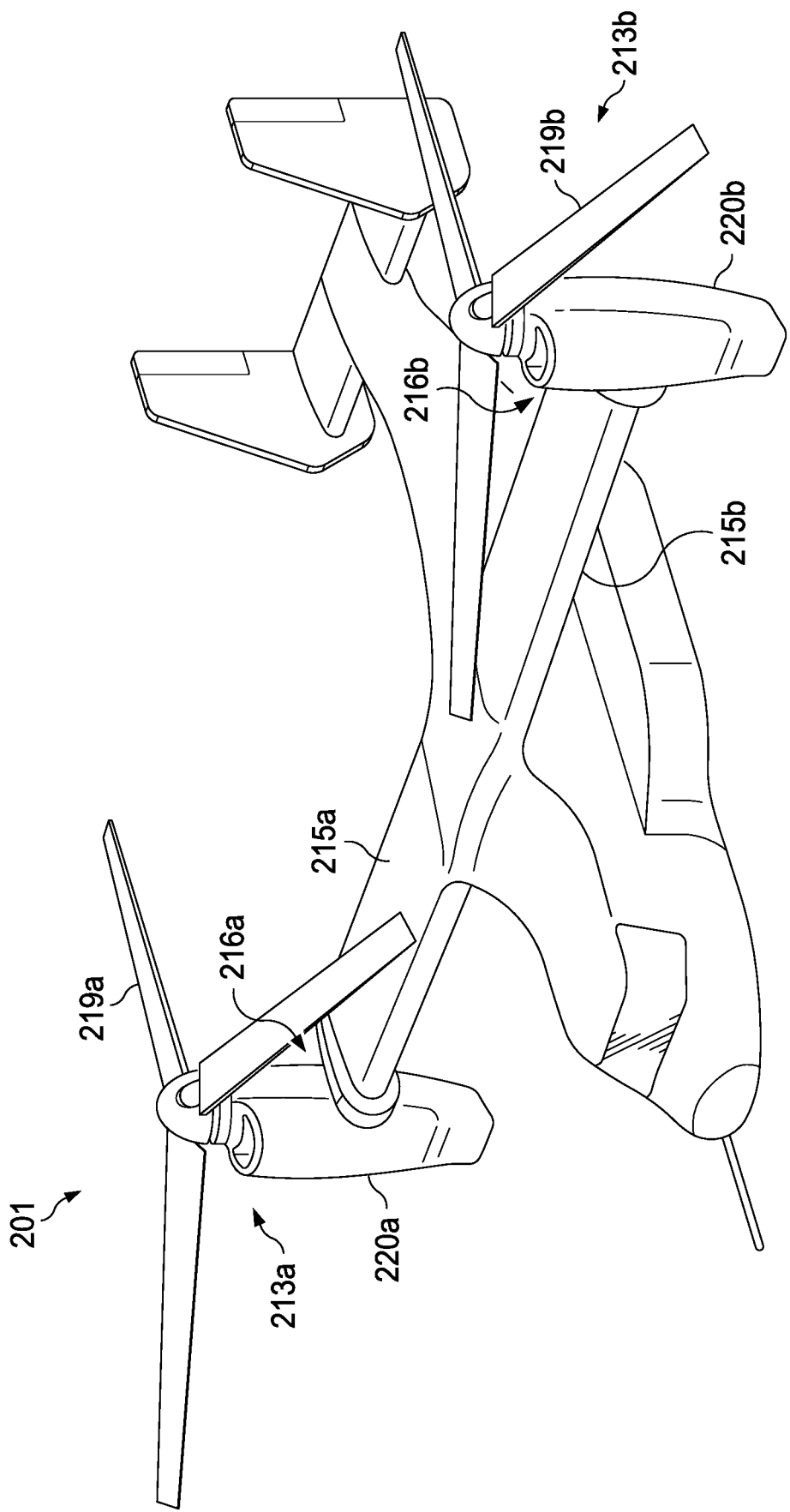
FIG. 3 is a perspective view of a tiltrotor aircraft according to an alternative embodiment.

Although the systems, devices, and methods shown are described in relation to the rotorcraft 101, it will be appreciated that the systems, devices, and methods of the present application could also be utilized with different types of rotary aircraft and vehicles. For example, FIG. 3 illustrates an aircraft 201 that utilizes the system in accordance with the present application.

Tiltrotor aircraft 201 includes rotor assemblies 213a, 213b that are carried by wings 215a, 215b, and are disposed at end portions 216a, 216b of wings 215a, 215b, respectively. Tiltrotor assemblies 213a, 213b include nacelles 220a, 220b, which carry the engines and transmissions of tiltrotor aircraft 201, as well as, rotor proprotors 219a, 219b on forward ends of tiltrotor assemblies 213a, 213b, respectively. Tiltrotor assemblies 213a, 213b move or rotate relative to wing members 215a, 215b between a helicopter mode in which tilt rotor assemblies 213a and 213b are tilted upward, such that tiltrotor aircraft 201 flies like a conventional helicopter; and an airplane mode in which tiltrotor assemblies 213a and 213b are tilted forward, such that tilt rotor aircraft 201 flies like a conventional propeller driven aircraft.

Figure 4:
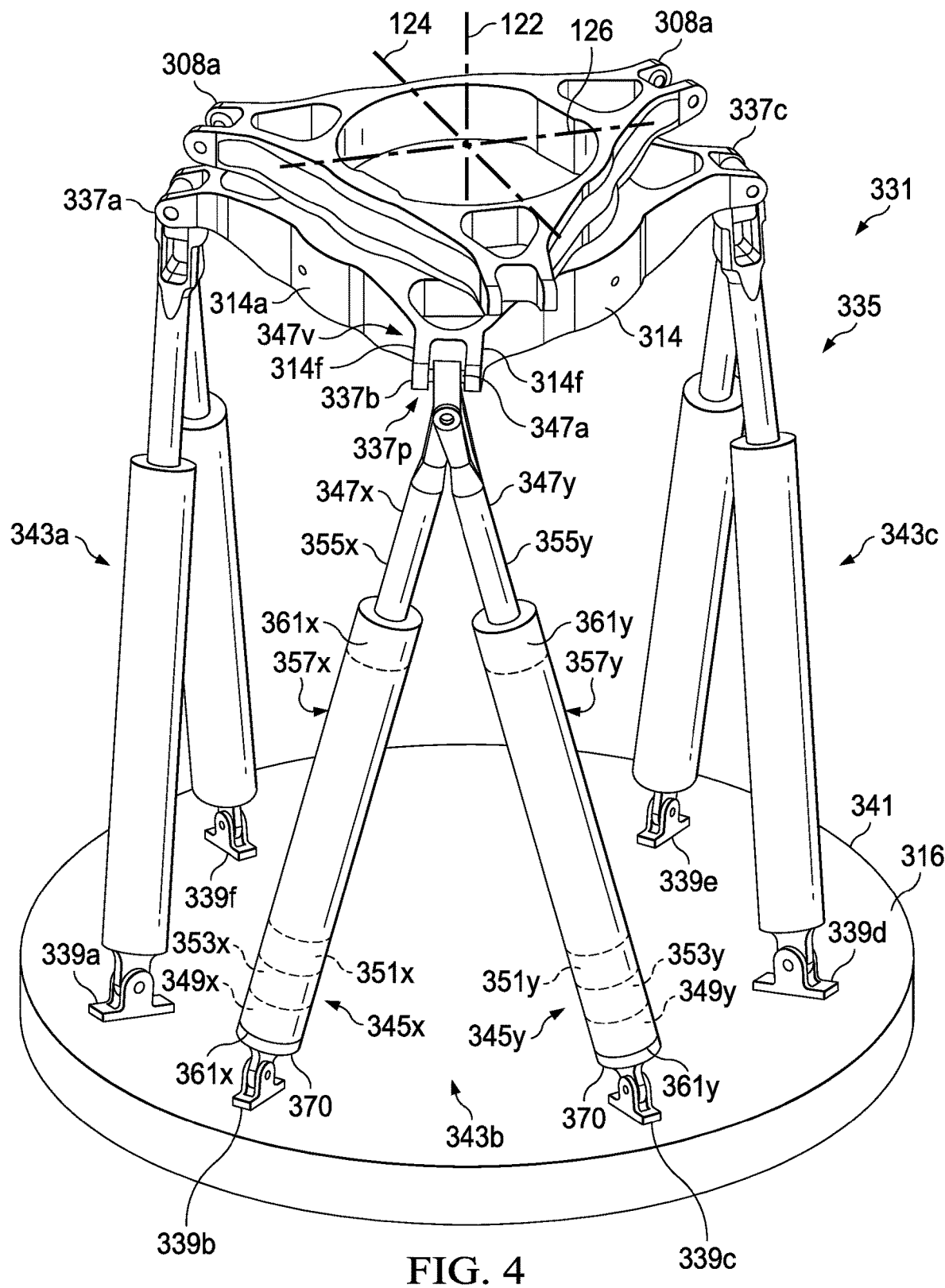
FIGS. 4-5 are perspective views of a rotor blade control system with a swashplate actuation mechanism.
Figure 5:
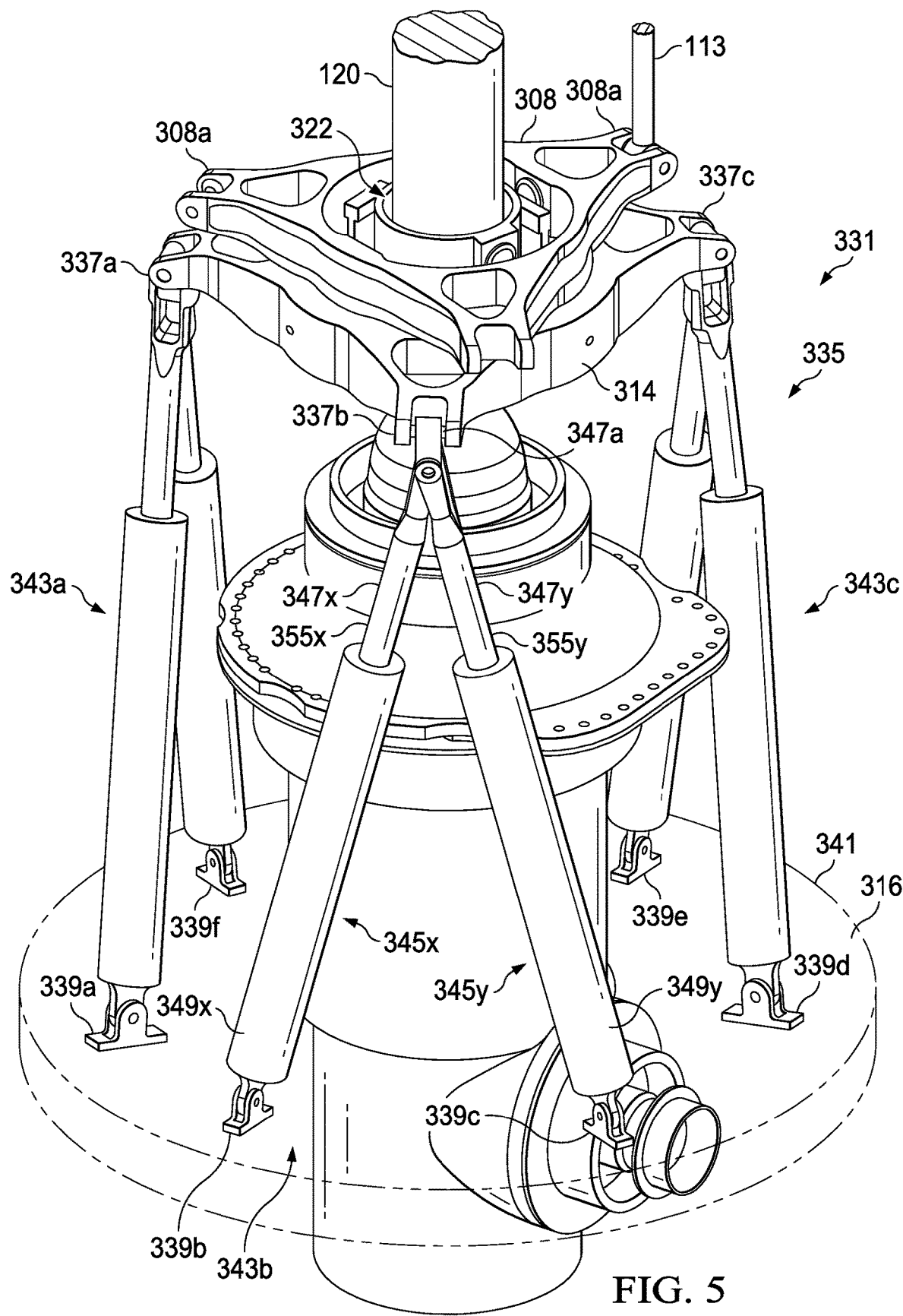

The rotor assemblies 103, 213a, 213b described herein can be controlled by a rotor blade control system 331 as shown in FIGS. 4-5, wherein like reference characters identify corresponding or similar elements throughout the several views. In contemplated embodiments, the system 331 includes a rotor assembly 103, 213a, 213b. In the illustrative embodiments in FIGS. 4-5, many of the components of the rotor assembly 103, 213a, 213b along with the additional blades are removed for clarity but shown in FIG. 2. In a contemplated embodiment, rotor blade control system 331 includes the mast 120 attached to the hub assembly 121 configured to pivotally attached to a plurality of rotor blades 105. The mast 120 extends from the gearbox 119, through a base 341 and swashplate assembly 107 and to hub assembly 102.

Rotor blade control system 331 includes a swashplate assembly 307 and a swashplate actuation mechanism 335. The swashplate assembly 307 includes a rotating ring 308 and a non-rotating ring 314 configured to engage and guide the position and movement of the rotating ring 308. The rotating ring 308 includes a plurality of pitch link attachment members 308a configured for attaching a pitch link 113 (only one shown in FIG. 5 for clarity) thereto. During operation, the rotating ring 308 is configured to pivot the associated rotor blade 105 via pitch link 113. A bearing or other friction reducing member may be disposed between the rotating ring 308 and non-rotating ring 314 to reduce the friction and maintain an engagement between the rotating ring 308 and non-rotating ring 314.

The rotating ring 308 is torsionally locked to mast 120 such that the rotating ring 308 rotates with the mast 120. This may be accomplished using a number of configurations. In an illustrative embodiment, a gimbal ring 322 engages the rotating ring 308 to the mast 120 to rotate therewith. In other embodiments, the rotating ring 308 is coupled to the mast 120 via a splined connection.

The non-rotating ring 314 includes a plurality of coupling locations 337a-c disposed on an outer surface 314a. In an exemplary embodiment, the coupling locations 337a-c are located substantially equidistant around the circumference of the non-rotating ring 314. In an exemplary embodiment, the plurality of coupling locations 337a-c has three coupling locations. In other embodiments, the plurality of coupling locations can comprise four, five, six, seven, eight, or more coupling locations around the circumference of the non-rotating ring. In an exemplary embodiment, as shown in FIGS. 4-5, the non-rotating ring 314 includes three coupling locations 337a-c (e.g., first coupling location 337a, second coupling location 337b, and third coupling location 337c), each coupling location 337a-c having a pivot joint formed of a pair of flanges 314f protruding outward from the non-rotating ring 314 and forming a channel therebetween and pivotally coupled to the outboard ends 347x, 347y of a respective substantially triangular dual actuator assembly 343a-c. The coupling locations 337a-c can be arranged radially outward and substantially equidistant from each other (e.g., having predetermined constant spacing therebetween around the circumference of the non-rotating ring 314; the first, second, and third coupling locations 337a-c are not adjacent to one another but are spaced around the circumference). For example, the predetermined constant spacing is substantially the same between the first, second, and third coupling locations 337a-c.

The swashplate actuation mechanism 335 comprises a plurality of substantially triangular dual actuator assemblies 343a-c that are independently and concurrently operable to move the respective coupling location 337a-c so as to impart movement on the non-rotating ring 314. The swashplate actuation mechanism 335 is configured to move the swashplate assembly 307 about a longitudinal axis 124 and a lateral axis 126 in response to a cyclic input. In addition, the swashplate actuation mechanism 335 is configured to move the swashplate assembly 307 along the mast axis 122 in response to a collective input. The swashplate actuation mechanism 335 balances the rotating and non-rotational forces incurred on the swashplate assembly 307 while preventing rotation of the non-rotating ring 314; thus, advantageously eliminating the need for an anti-drive mechanism.

The swashplate actuation mechanism 335 is pivotally coupled at an outboard end with the non-rotating ring 314 at the plurality of coupling locations 337a-c for and pivotally coupled at an inboard end with a base 341 at a plurality of base locations 339a-f. In an embodiment, the base 341 is a top case 316 of the main rotor gearbox 119. In illustrative embodiments, the plurality of base locations 339a-f are disposed on an upper facing surface of the top case. In another embodiment, the base 341 is a side facing surface of a gearbox 119.

Each of the substantially triangular dual actuator assemblies 343a-c (e.g., a first substantially triangular dual actuator assembly 343a, a second substantially triangular dual actuator assembly 343b, a third substantially triangular dual actuator assembly 343c) are substantially identical; therefore, for sake of efficiency the plurality of substantially triangular dual actuator assemblies 343a-c will be disclosed only with regard to the second substantially triangular dual actuator assembly 343b. However, one of ordinary skill in the art would fully appreciate an understanding of the first and third dual actuator assemblies 343a, 343c based upon the disclosure herein of the second substantially triangular dual actuator assembly 343b.

The second substantially triangular dual actuator assembly 343b includes a first actuator element 345x and a second actuator element 345y are substantially identical. The first and second actuator elements 345x, 345y are pivotally coupled at outboard ends 347x, 347y with the coupling location 337b of the non-rotating ring 314 and pivotally coupled at inboard ends 349x, 349y with the base locations 339b, 339c, respectively. The outboard ends 347x, 347y of the first and second actuator elements 345x, 345y are secured at a coupling location 337b (e.g., a second coupling location 337b) on the non-rotating ring 314. The coupling location 337b is the locus of the apex 347a (e.g., the top, highest, or most outboard end of the substantially triangular arrangement) of the substantially triangular arrangement of the first and second actuator elements 345x, 345y In other words, the first and second actuator elements 345x, 345y define the first and second sides, respectively, of the substantially triangular arrangement with the base 341 defining the bottom side of the substantially triangular arrangement. In some embodiments, the apex 347a with the first and second actuator elements 345x, 345y define an acute angle. In an embodiment, the first and second actuator elements 345x, 345y are secured at the second coupling location 337b, as shown in FIGS. 4 and 5 (e.g., the second coupling location 337b is a vertex 347v of the apex 347a). The second coupling location 337 is a common coupling location for the outboard ends of the actuator elements 345x, 345y. The outboard ends 347x, 347y are secured to a common pivot joint 337p disposed between two flanges 314f extending outwardly from the non-rotating ring 314. In some embodiments, the coupling location includes two or more pivot points for securing the outboard ends thereon at a coupling location but at separate pivot joints.

The second substantially triangular dual actuator assembly 343b is pivotally attached only to the non-rotating ring 314 and the base 341 (e.g., not connected to the rotating ring 308, nor to a pitch link 113). The substantially triangular arrangement of the first and second actuator elements 345x, 345y advantageously balances the rotational and non-rotational forces incurred on the non-rotating ring 314 while preventing rotation thereof. In addition, the triangular arrangement of the first and second actuator elements 345x, 345y provide an added level of safety in preventing rotation of the non-rotating ring 314 if the first or second actuator element 345x, 345y malfunctions, functioning actuator element will continue to operate and prevent anti-rotation.

The swashplate actuation mechanism 335 is pivotally coupled at an outboard end with the non-rotating ring 314 at the plurality of coupling locations 337a-c and pivotally coupled at an inboard end with a base 341 at a plurality of base locations 339a-f. In an embodiment, the base 341 is a top case 316 of the main rotor gearbox 119. In illustrative embodiments, the plurality of base location 339a-f are disposed on an upper facing surface of the top case. In another embodiment, the base 341 is a side facing surface of housing and/or gearbox.

Figure 6A:
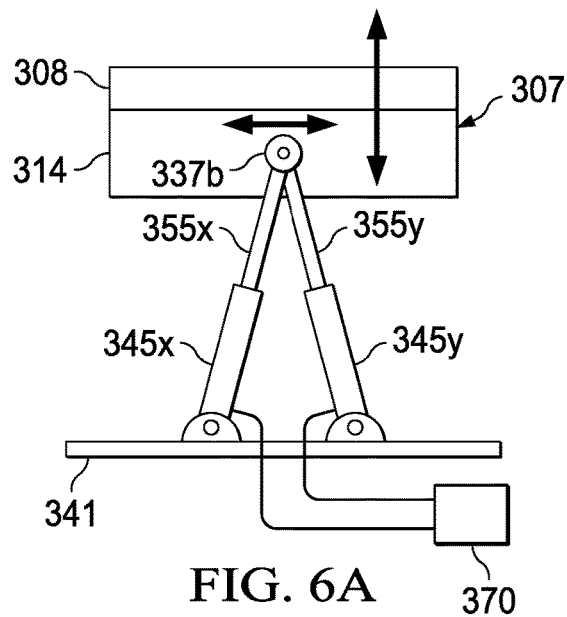
FIGS. 6A-6D are schematic views of a substantially triangular dual actuator assembly moving a swashplate assembly to various locations according to an embodiment.
Figure 6B:
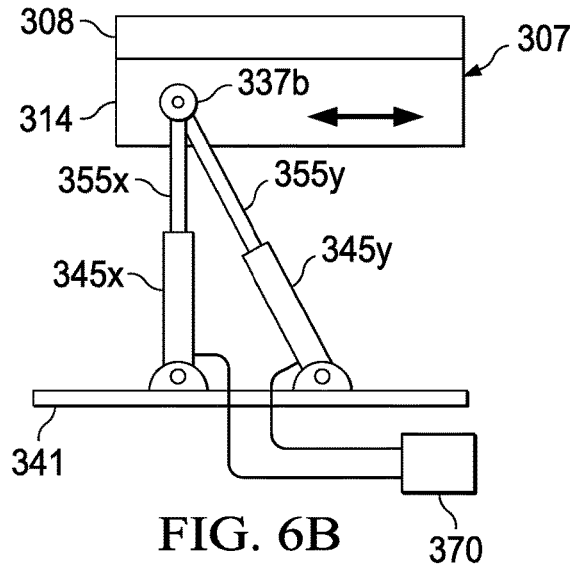
Figure 6C:
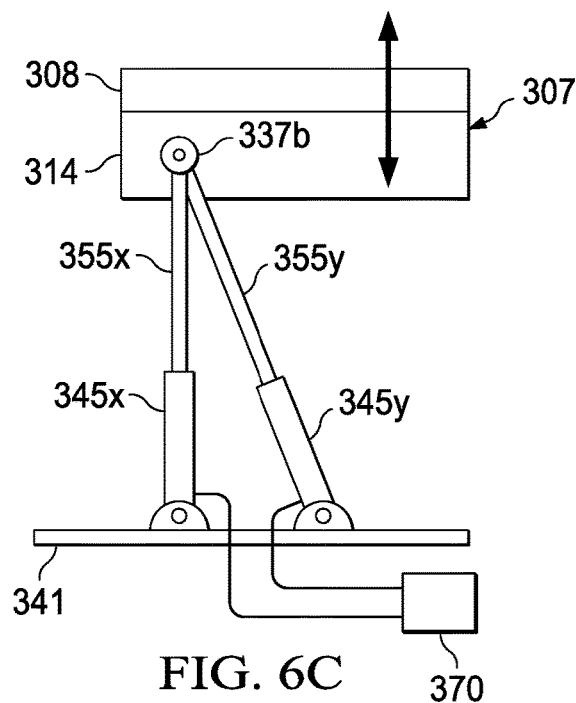
Figure 6D:
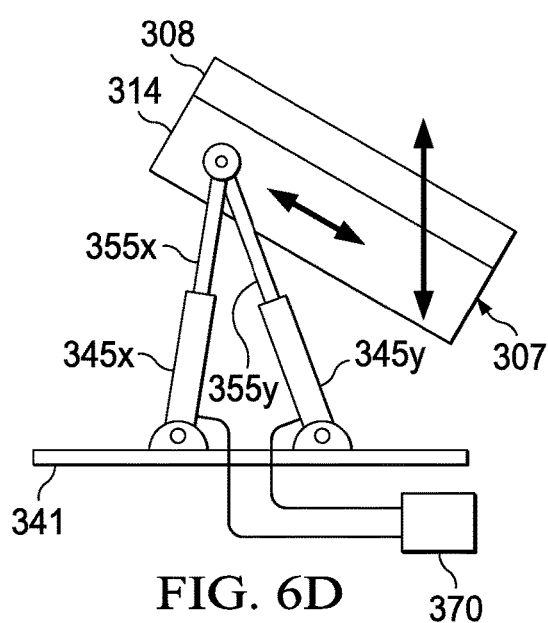
Figure 6E:
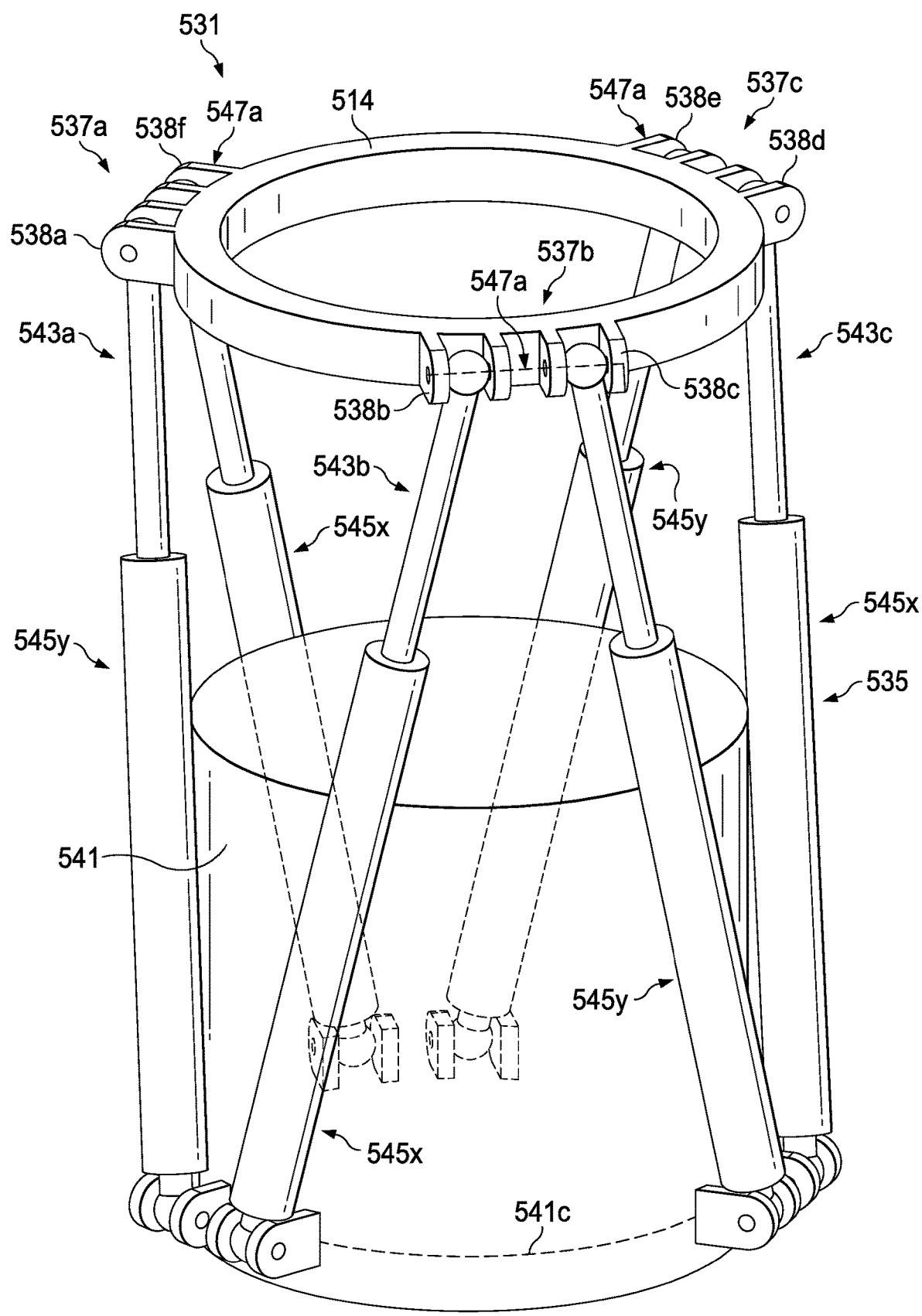
FIG. 6E is a schematic view of a swashplate actuation mechanism connected to a non-rotating ring and base, according to one embodiment.

Another exemplary embodiment of a swashplate actuation mechanism 535 for a rotor blade control system 531 is illustrated in FIG. 6E, where like features are identified by like numerals except with a leading '5' rather than a leading '3'. For purposes of clarity of illustration the swashplate actuation mechanism 535 is shown including the non-rotating ring 514 connected to the substantially triangular dual actuator assembles 543a-c and a base 541 (e.g., the rotating ring is omitted to illustrate the coupling locations 537a-f of the non-rotating ring 514); however, it would understood by those skilled in the art and as illustrated in FIGS. 4-5 that the rotating ring would be positioned as shown in FIGS. 4-5. The substantially triangular dual actuator assemblies 543a-c are secured at coupling locations 537a-c including at least two pivot joints 538a-538f (e.g., separate pivot joints). According to the illustrative embodiment, the two or more pivot joints includes a first pivot joint 538a, a second pivot joint 538b, a third pivot joint 538c, a fourth pivot joint 538d, a fifth pivot joint 538e, and a sixth pivot joint 538f. For example, first coupling location 537a includes two pivot joints 538a, 538f (e.g., first and sixth pivot joints); second coupling location 537b includes two pivot joints 538b, 538c (e.g., second and third pivot joints); and third coupling location 537c includes two pivot joints 538d, 538e (e.g., fourth and fifth pivot joints). The second substantially triangular dual actuator assembly 543b, which is described herein as a representative example of the first and third substantially triangular dual actuator assemblies 543a, 543c, includes first and second actuator elements 545x, 545y secured at the second coupling location 537b at two separate pivot joints 538b, 538c on the non-rotating ring 514. The coupling location 537b is the locus of the apex 547a of the substantially triangular arrangement of the first and second actuator elements 545x, 545y (e.g., the first and second actuator elements 545x, 545y defining the first and second sides, respectively, of the substantially triangular arrangement). The outer circumference 541c of the base 541 defines the bottom side of the substantially triangular arrangement. As shown in FIG. 6E, the apex 547a is a substantially curved and/or substantially straight line such that the substantially triangular arrangement includes a crescent shape, frustotriangular shape, and/or a trapezoidal shape, respectively (e.g., the apex 547a does not include a vertex). The term "frustotriangular" means a truncated triangle, e.g., the part that is left when a triangle is cut by a line parallel to the base of the triangle and the vertex-portion of the apex 547a is removed. The first and second actuator elements 545x, 545y are secured at separate second and third pivot joints 538b, 538c at second coupling location 537b, as shown in FIG. 6E. Advantageously, the swashplate mechanism 535 includes six pivot joints on the non-rotating ring 514. The spaced apart pivot joints 538a-f can provide additional flexibility during installation of the swashplate actuation mechanism 535 and can be particularly beneficial for tiltrotor aircraft 201.

The first and second actuator elements 345x, 345y are independently and concurrently operable to move the coupling location 337b of the non-rotating ring 314. The first and second actuator elements 345x, 345y each includes a primary actuating device 351x, 351y (shown schematically in FIG. 4) configured to extend and/or withdraw a movable rod 355x, 355y from an actuator body 357x, 357y, respectively. The primary actuating devices 351x, 351y are configured to pull and/or push the respective actuator rod 355x, 355y to move the position of the coupling location 337b which moves the non-rotating ring 314 of the swashplate assembly 307. In an embodiment, the moveable rods 355x, 355y are pivotably coupled at the outboard ends to the respective coupling location of the non-rotating ring 314 (e.g., the second coupling location 337b). For example, FIG. 6A illustrates the first and second actuating device 345x, 345y with the rods 355x, 355y extended upward which moves the coupling location 337b upward along mast axis 122 in response to a collective input from a flight control computer 370. FIG. 6B shows second rod 355y extended further than first rod 355x to impart movement side-to-side and/or fore and aft of the coupling location 337b in response to a cyclic input from flight control computer 370. In FIG. 6C, the cyclic input of FIG. 6B is maintained while the first and second rods 355x, 355y are extended concurrently and independently at the same rate upward along mast axis 122 in response to a collective input from flight control computer 370. In another example, the first and second rods 355x, 355y are extended independently and concurrently at different rates and lengths to move the position of the coupling location 337b to tilt the non-rotating ring 314 in response to a cyclic input from flight control computer 370. Advantageously, the substantially triangular dual actuator assemblies can concurrently and independently provide fore and aft, side to side, and upward and downward movement to the respective coupling location 337a-c.

In some embodiments, the first and second actuator elements 345x, 345y can further include secondary actuating devices 353x, 353y configured to extend and/or withdraw the movable rod 355x, 355y from the actuator body 357x, 357y, respectively. In an embodiment, the secondary actuating devices 353x, 353y can be configured to work with the primary actuating devices 351x, 351y to provide additional power and/or speed for moving the respective rod 355x, 355y. In some exemplary embodiments the secondary actuator devices 353x, 353y provide a redundant device to withdraw and extend the respective rod when the respective primary actuating device 351x, 351y fails. The secondary actuator devices 353x, 353y can be in series or parallel arrangement with the primary actuator devices 351x, 351y and can advantageously provide a double redundant actuation device for each of the substantially triangular dual actuator assemblies 343a-c, which can improve safety and reduce certification requirements of the aircraft.

In illustrative embodiments, the first and second actuator elements 345x, 345y comprise at least one of the following: a linear actuator, an electric actuator, a pneumatic actuator, a hydraulic actuator, and an electromechanical rotary actuator. It should be noted that these are merely examples of actuators for the actuator elements 345x, 345y. The actuator elements 345x, 345y may be implemented using any number of techniques, whether currently known or not.

It will be appreciated that the plurality of substantially triangular dual actuator assemblies 343a-c is shown as three substantially triangular dual actuator assemblies such that the plurality of substantially triangular dual actuator assemblies 343a-c is pivotally coupled with the non-rotating ring 314 at three coupling locations 337a-c arranged in a triangular pattern and pivotally coupled with the base at six base locations 339a-f arranged in a hexagon pattern. However, it is contemplated that four, five, six or more substantially triangular dual actuator assemblies could be implemented. For example, the plurality of substantially triangular dual actuator assemblies can be pivotally coupled with the non-rotating ring at four coupling locations arranged in a square pattern and pivotally coupled with the base at eight base locations arranged in an octagon pattern.

In an embodiment, the swashplate actuation mechanism 335 further includes and comprises at least one position sensors 361, shown schematically on FIG. 4, associated with each of the first and second actuator elements 345x, 345y. In an embodiment, first and second position sensors 361x, 361y are configured for measuring a position of the respective first and second actuator elements 345x, 345y. The position sensors 361x, 361y are each operatively coupled to the respective first and second actuator element 345x, 345y so as to measure the position (e.g., x, y, and/or z position) and/or movement of thereof. It is understood that in some embodiments the position sensors 361x, 361y may be comprised of at least one of the following: a linear variable differential transducer, a rotary variable differential transducer, an incremental or absolute encoder, a linear or rotary potentiometer, an accelerometer, and a three dimensional position sensor. It should be noted that these are merely examples of positional data gathering devices for the position sensors 361x, 361y. The position sensors 361x, 361y may be implemented using any number of techniques, whether currently known or not. The position sensor 361x, 361y generates position and/or movement data, which may be transmitted electronically to the flight control computer 370. The data from the position sensors 361x, 361y can advantageously be used to detect if the respective actuator element 345$x$, 345$y$ performs as expected by comparing the position and/or movement of the actuator element 345$x$, 345$y$ to the commanded cyclic and/or collective input from the flight control system 370. In an exemplary embodiment, each first and second actuator element 345$x$, 345$y$ includes a position sensor 361$x$, 361$y$ respectively. In some embodiments, each primary actuating device 351$x$, 351$y$ and secondary actuating device 353$x$, 353$y$ includes a position sensor (e.g., there are two position sensors per actuator element 345$x$, 345$y$). In some embodiments, there is more than one position sensor 361$x$, 361$y$ per actuator element 345$x$, 345$y$, as illustrated in FIG. 4, to provide redundant positional data for the swashplate actuation mechanism 335.

Figure 7:
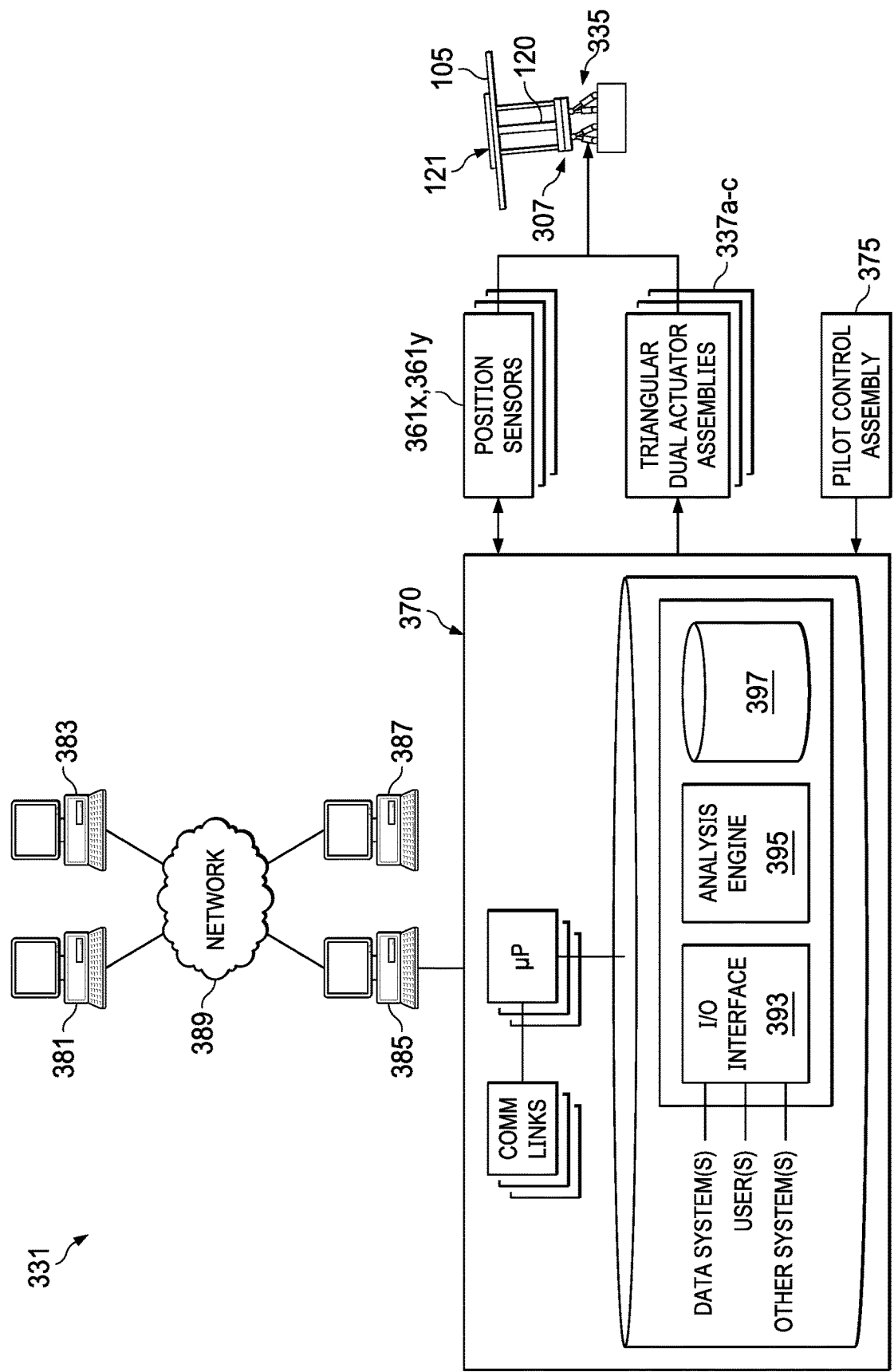
FIG. 7 illustrates a block diagram of an embodiment of a rotor blade control system, according to one exemplary embodiment.

FIG. 7 schematically illustrates the rotor blade control system 331. The control system 331 can have one or more flight control computers 370 (FCCs). In some embodiments, multiple FCCs 370 are provided for redundancy. One or more modules within the FCCs 370 may be partially or wholly embodied as software and/or hardware for performing any functionality described herein. In embodiments where the system 331 includes a fly-by-wire (FBW) flight control system, the FCCs 370 may analyze pilot inputs and dispatch corresponding commands to the engine control computers, the tail rotor actuator, and/or the plurality of substantially triangular dual actuator assemblies 343$a$-$c$ to control the swashplate 307. Further, the FCCs 370 are configured to receive input commands (e.g., cyclic inputs, collective inputs, speed inputs, etc.) from a pilot control assembly 375 through sensors associated with each of the pilot flight controls. The FCC 370 is in electrical communication with the swashplate actuation mechanism 335 and the pilot control assembly 375 such that the FCC 370 is configured to make a command to at least one of the substantially triangular dual actuator assemblies 343$a$-$c$ to move swashplate assembly 307 along at least one of a longitudinal axis, a lateral axis, and a mast axis. Advantageously, the FBW technology combined with the swashplate actuation mechanism 335 makes it possible to accurately translate the swashplate 307 in three-dimensional space without rotation of the non-rotating ring 314 unless desired. The FCCs 370 also control tactile cueing commands to the pilot controls or display information in instruments on an instrument panel. Some or all of the components of the system 331, 381, 383, 385, 387 could be located external or remote from aircraft and communicate to on-board devices through a network connection 389.

The FCC 370 can be configured for performing one or more functions with regard to the operation of the control system 331, as described herein. Further, any processing and analysis can be partly or fully performed by the flight control computer system 370. The flight control computer system 370 can be partly or fully integrated with other aircraft computer systems or can be partly or fully removed from the rotorcraft.

The FCC 370 can include an input/output (I/O) interface 393, an analysis engine 395, and a database 397. Alternative embodiments can combine or distribute the I/O interface 393, the analysis engine 395, and the database 397, as desired. Embodiments of the FCC 370 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 393 can provide a communication link between external users, systems, and data sources and components of the FCC 370. The I/O interface 393 can be configured for allowing one or more users to input information to the FCC 370 via any known input device. Examples can include a keyboard, mouse, touch screen, and/or any other desired input device. The I/O interface 393 can be configured for allowing one or more users to receive information output from the FCC 370 via any known output device. Examples can include a display monitor, a printer, cockpit display, and/or any other desired output device. The I/O interface 393 can be configured for allowing other systems to communicate with the FCC 370. For example, the I/O interface 393 can allow one or more remote computer(s) to access information, input information, and/or remotely instruct the FCC 370 to perform one or more of the tasks described herein. The I/O interface 393 can be configured for allowing communication with one or more remote data sources. For example, the I/O interface 393 can allow one or more remote data source(s) to access information, input information, and/or remotely instruct the FCC 370 to perform one or more of the tasks described herein.

The database 397 provides persistent data storage for the FCC 370. Although the term "database" is primarily used, a memory or other suitable data storage arrangement may provide the functionality of the database 397. In alternative embodiments, the database 397 can be integral to or separate from the FCC 370 and can operate on one or more computers. The database 397 preferably provides non-volatile data storage for any information suitable to support the operation of the control system 331 and the method 400, including various types of data discussed further herein. The analysis engine 395 can include various combinations of one or more processors, memories, and software components.

Figure 8:
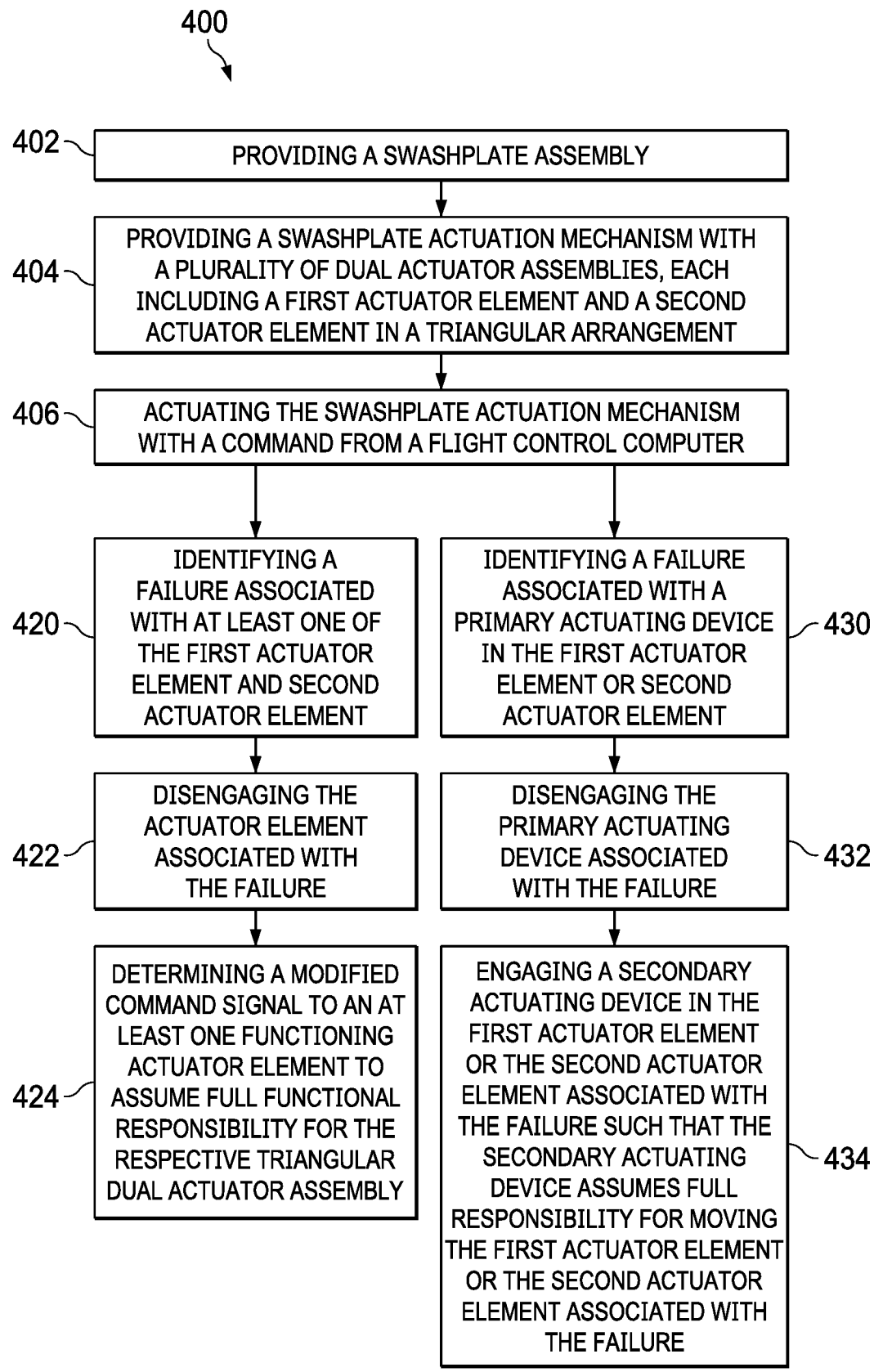
FIG. 8 illustrates a flow diagram of a method of controlling a plurality of rotor blades, according to an exemplary embodiment.

FIG. 8 shows a flowchart of an example method of controlling a plurality of rotor blades 400 that can be implemented by example system 331. In an embodiment of the method 400, actuation of the swashplate 307 is achieved by the swashplate actuation mechanism 335 in the system 331. A step 402 in the method 400 includes providing a swashplate assembly engaged with the mast, the swashplate including a rotating ring; a non-rotating ring; and a gimbal ring disposed between the rotating ring and the mast.

The method 400 includes a step 404 of providing a swashplate actuation mechanism pivotally coupled with the non-rotating ring at a plurality of coupling locations for moving the non-rotating ring and pivotally coupled with a base at a plurality of base locations, the swashplate actuation mechanism comprises a plurality of substantially triangular dual actuator assemblies that are independently and concurrently operable to move the respective coupling location so as to impart movement on the non-rotating ring, each of the substantially triangular dual actuator assemblies comprises a first actuator element and a second actuator element that are secured at a coupling location that defines the apex of a substantially triangular dual actuator assembly.

A step 406 of the method 400 includes actuating the swashplate actuation mechanism with a command from a flight control computer to the first actuator element and the second actuator element in each of the plurality of substantially triangular dual actuator assemblies so as to move the swashplate assembly along at least one of a longitudinal axis, a lateral axis, and a mast axis.

In some embodiments the method 400 includes the steps 420, 422, and 424 as described herein to advantageously provide redundant actuation at the respective coupling location of the swashplate. A step 420 includes identifying a failure associated with at least one of the first actuator element and the second actuator element in a substantially triangular dual actuator assembly; a step 422 includes disengaging the actuator element associated with the failure; and a step 424 includes determining a modified command signal to an at least one functioning actuator element, the modified command signal configured such that the at least one functioning actuator element assumes full functional responsibility for the respect substantially triangular dual actuator assembly (e.g., associated with the substantially triangular dual actuator assembly having a failed actuator element).

In some exemplary embodiments the method 400 includes the steps 430, 432, and 434 as described herein. A step 430 includes identifying a failure associated with a primary actuating device of a first actuator element or a second actuator element; a step 432 includes disengaging the primary actuating device associated with the failure; and a step 434 includes engaging a secondary actuating device in the first actuator element or the second actuator element associated with the failure such that the secondary actuating device assumes full functional responsibility for moving the first actuator element or the second actuator element associated with the failure. The steps 430, 432, and 434 advantageously provide redundant actuating for a failed actuating device that improves safety of the aircraft.

The method 400 provides methods that offer redundant actuation of the swashplate that can provide an added level of safety for the aircraft.

The rotor blade control system, devices, and methods that are detailed above provide numerous advantages to aircrafts and to rotor assemblies, including to rotor assemblies used on an aircraft during flight. The rotor blade control system, devices, and methods can provide at least one of the following advantages: improved and easier design and installation since the system allows for rotor phasing adjustment without the need for mechanically clocking the swashplate; lighter weight configuration (as compared to swashplate with an anti-drive); eliminates the anti-drive mechanism, dual redundant actuators and/or positional sensors improves safety; the configuration has a smaller envelope to the hub region (eliminates bulky anti-drive mechanism extending beyond the swashplate circumference and eliminates large actuator mechanisms disposed on a surface of the gearbox); reduced operating costs; adaptable for tiltrotor aircraft; eliminates the tilt ball, which reduces costly replacement thereof; and reduces flight critical parts. The disclosed rotor blade control system, devices and methods increase pilot control and/or control of the aircraft, which ultimately improves safety.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Terms such as "first" and "second" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A rotor blade control system comprising:
   a hub assembly pivotally attached to a rotor blade; a mast attached to the hub assembly;
   a swashplate assembly engaged with the mast, the swashplate assembly comprising:
   a rotating ring;
   a non-rotating ring; and
   a gimbal ring disposed between the rotating ring and the mast;
   a base spaced apart from the non-rotating ring; and
   a swashplate actuation mechanism pivotally coupled with the non-rotating ring at a plurality of coupling locations for moving the non-rotating ring and pivotally coupled with the base at a plurality of base locations, the swashplate actuation mechanism comprises a plurality of substantially triangular dual actuator assemblies that are independently and concurrently operable to move the respective coupling location so as to impart movement on the non-rotating ring, each of the substantially triangular dual actuator assemblies comprises a first actuator element and a second actuator element that are secured at a coupling location that defines an apex of a substantially triangular dual actuator assembly;
   wherein the first actuator element and the second actuator element each comprise a pneumatic actuator;
   wherein the first actuator element and the second actuator element each comprise a primary and a secondary actuating device configured to extend and/or withdraw a movable rod from an actuator body;
   wherein the primary and secondary actuating device are in a series or parallel arrangement;
   wherein the swashplate actuation mechanism is configured to move the swashplate assembly about a longitudinal axis and a lateral axis in response to a cyclic input;
   wherein the swashplate actuation mechanism is configured to move the swashplate assembly along the mast in response to a collective input.

2. The rotor blade control system of claim 1, wherein the base comprises an upper surface facing on a gearbox.

3. The rotor blade control system of claim 1, wherein the base comprises a side surface on a gearbox.

4. The rotor blade control system of claim 1, wherein the swashplate actuation mechanism further comprises a position sensor associated with each of the first actuator element and the second actuator element, the position sensor configured for measuring a position of the respective first actuator element and second actuator element.

5. The rotor blade control system of claim 1, wherein the first actuator element and the second actuator element are independently and concurrently operable to move the coupling location of the non-rotating ring.

6. The rotor blade control system of claim 5, wherein the first and the second actuator elements being independently operable to extend and/or withdraw a first and second movable rod from a first and second actuator body, respectively, the first and second movable rods meet at the coupling location to define the apex of the substantially triangular dual actuator assembly.

7. The rotor blade control system of claim 1, wherein the plurality of substantially triangular dual actuator assemblies is pivotally coupled with the non-rotating ring at three coupling locations arranged in a triangular pattern and pivotally coupled with the base at six base locations arranged in a hexagon pattern.

8. The rotor blade control system of claim 7, wherein the three coupling locations each comprises a common coupling location.

9. The rotor blade control system of claim 7, wherein each of the coupling locations includes at least two pivot joints.

10. The rotor blade control system according to claim 1, further comprising:
    a pilot control assembly configured to receive commands from a pilot; and
    a flight control computer in electrical communication with the swashplate actuation mechanism and the pilot control assembly, the flight control computer configured to make a command to at least one of the substantially triangular dual actuator assemblies to move the swashplate assembly along at least one of a longitudinal axis, a lateral axis, and a mast axis.

11. The rotor blade control system according to claim 10, wherein the flight control computer comprises a fly-by-wire flight control system in electrical communication with the pilot control assembly.

12. The rotor blade control system according to claim 10, further comprising the flight control computer configured to:
    identify a failure associated with at least one of the first actuator element and the second actuator element in a substantially triangular dual actuator assembly;
    disengage the actuator element associated with the failure; and
    determine a modified command signal to an at least one functioning actuator element, the modified command signal configured such that the at least one functioning actuator element assumes full functional responsibility for the substantially triangular dual actuator assembly.

13. The rotor blade control system according to claim 10, further comprising the flight control computer configured to:
    identify a failure associated with a primary actuating device of a first actuator element or a second actuator element;
    disengage the primary actuating device associated with the failure; and
    engage the secondary actuating device in the first actuator or the second actuator element associated with the failure such that the secondary actuating device assumes full functional responsibility for moving the first actuator element or the second actuator element associated with the failure.

14. A method of controlling a plurality of rotor blades, the plurality of rotor blades rotatably connected to a hub assembly attached to a mast, the method comprising: providing a swashplate assembly engaged with the mast, the swashplate assembly comprising:
    a rotating ring;
    a non-rotating ring; and
    a gimbal ring disposed between the rotating ring and the mast;
    providing a swashplate actuation mechanism pivotally coupled with the non-rotating ring at a plurality of coupling locations for moving the non-rotating ring and pivotally coupled with a base at a plurality of base locations, the swashplate actuation mechanism comprises a plurality of substantially triangular dual actuator assemblies that are independently and concurrently operable to move the respective coupling location so as to impart movement on the non-rotating ring, each of the substantially triangular dual actuator assemblies comprises a first actuator element and a second actuator element that are secured at a coupling location that defines an apex of a substantially triangular dual actuator assembly, each of the first actuator element and the second actuator element comprise a pneumatic actuator, the first actuator element and the second actuator element each comprise a primary and a secondary actuating device configured to extend and/or withdraw a movable rod from an actuator body;

wherein the primary and secondary actuating device are in a series or parallel arrangement;

actuating the swashplate actuation mechanism with a command from a flight control computer to the first actuator element and the second actuator element in each of the plurality of substantially triangular dual actuator assemblies so as to move the swashplate assembly along at least one of a longitudinal axis, a lateral axis, and a mast axis; and identifying a failure associated with the primary actuating device of a first actuator element or a second actuator element;

disengaging the primary actuating device associated with the failure; and engaging a secondary actuating device in the first actuator element or the second actuator element associated with the failure such that the secondary actuating device assumes full functional responsibility for moving the first actuator element or the second actuator element associated with the failure.

15. The method according to claim 14, wherein the flight control computer comprises a fly-by-wire flight control system in electrical communication with the pilot control assembly.

\* \* \* \* \*